Figure 1:
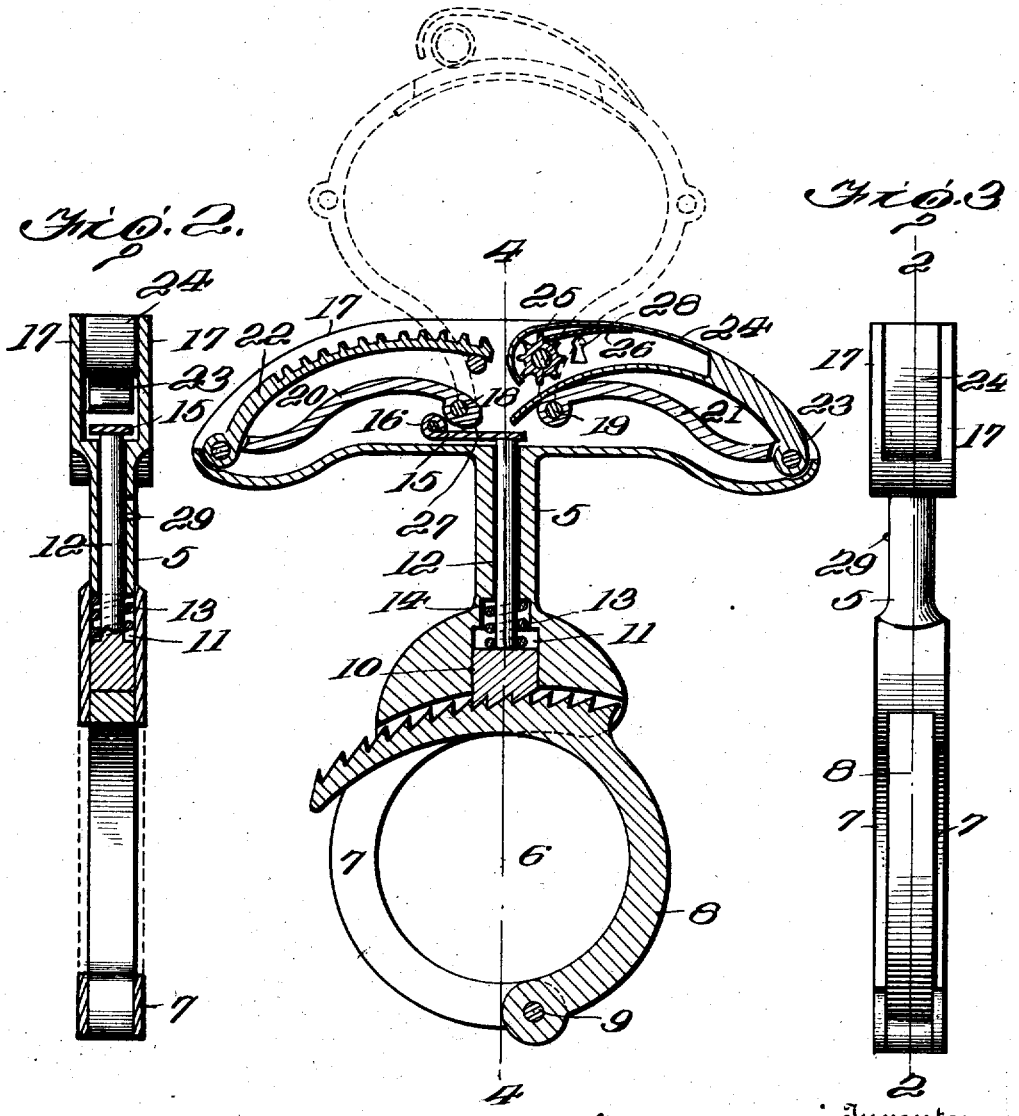

G. W. PRATT.

POLICEMAN'S NIPPERS AND HANDCUFFS COMBINED.

APPLICATION FILED DEC. 18, 1918.

Reissued Aug. 19, 1919. 14,714.

George W. Pratt Inventor

By Harry C. Schroeder

Attorney

UNITED STATES PATENT OFFICE.

GEORGE W. PRATT, OF OAKLAND, CALIFORNIA.

POLICEMAN'S NIPPERS AND HANDCUFFS COMBINED.

14,714. Specification of Reissued Letters Patent. Reissued Aug. 19, 1919.

Original No. 1,203,778, dated November 7, 1916, Serial No. 61,849, filed November 16, 1915. Application for reissue filed December 18, 1918. Serial No. 267,337.

*To all whom it may concern:*

Be it known that I, GEORGE W. PRATT, a citizen of the United States, residing at Oakland, in the county of Alameda and State of California, have invented a new and useful Policeman's Nippers and Handcuffs Combined, of which the following is a specification.

My invention relates to improvements in combined policemen's nippers and handcuffs in which a tubular stock connects an automatically acting hand-cuff with a hollow handle within which a jointed hand-cuff may be compactly folded and permit the device to be used as a policeman's nippers. The folded hand-cuff may when desired be extended and caused to assume the form of a hand-cuff which, in conjunction with the automatically actuated hand-cuffs, serves as a pair of hand-cuffs.

The objects of my improvement are, to provide policemen's nippers which may be quickly converted to a pair of handcuffs; second, to adjust the cuffs to large or small wrists and to lock the two cuffs when in use so that they can not be unlocked without the use of a suitably fitted key; third, to provide construction whereby, by unlocking one cuff, both cuffs may be opened and removed without difficulty and one of the cuffs folded down into a hollow handle transversely disposed with respect to the tubular connecting stock, the whole device simple and cheap in construction, light in weight, and easily operated. I attain these objects by the mechanism illustrated in the accompanying drawings, in which—

Figure 1 is a vertical section of the device taken on the plane of the line 2, 2, of Fig. 3. Fig. 2 is a vertical transverse section of the complete device taken on the plane of line 4, 4, of Fig. 1. Fig. 3 is an edge elevation of the same.

Similar numeral reference characters refer to similar parts throughout the several views.

A tubular stock 5 carries secured to one end a self acting hand-cuff 6 composed of the bifurcated depending semi-circular part 7, within the opening of which is pivoted one end of a sickle shaped tongue 8, the pivotal end shown at 9. The other end of the sickel shaped tongue 8, is serrated or toothed, for a suitable distance from the end thereof by transverse teeth the backs of which are inclined away from the end of the said tongue 8. The center of the radial points of the circle described by the points of the teeth of the said tongue 8 is the pivot 9. Engaging with the teeth of the tongue 8 are suitably shaped teeth formed on the under side of the retaining pawl 10 which is adapted to fit and vertically move in a correspondingly shaped cavity 11.

Vertically projecting from the top of the retaining pawl 10 is a rod 12 the lower part of which is inclosed by a coiled spring 13 the foot of which rests on top of the retaining pawl 10, the top of said spring pressing upward against, the top of the spring cavity 14, this arrangement serving to force the rod 12 and retaining pawl 10 into contact with the teeth of the tongue 8. Contacting with the top end of the rod 12 is the free end of a flap 15 which is pivoted at 16 to a transverse rod supported by the vertical walls of the hollow handle 17, the office of which will hereinafter be fully set forth.

The hollow handle 17 is transversely disposed on the tubular stock 5. Two rods 18, 19, transversely traverse the said handle, the rod 18 serving as pivot for one end of the S-shaped lever 20, the rod 19 serving as pivot for one end of the S-shaped lever 21, the free ends of both said levers being pivoted to upwardly curved extensions 22, 23. The lever extension 22 is provided on its curved back with teeth while the curved back of the lever 23 carries a housing 24 which incloses a pinion 25 provided with teeth of a pitch suitable to engage with the teeth on the back of the extension 22. The housing 24 also carries a spring pawl one end of which is secured to the inside top of said housing. The free end of the spring pawl 26 contacts with the teeth of the pinion 25 so as to prevent the latter from revolving to the right, but will allow it to revolve in the opposite direction, so as to permit the entrance of the toothed extension 22, within the housing 24 when the extensions 22, 23, are assuming the position shown by the dotted lines at the top of Fig. 1. In this position too, the enlargement 27 on the pivotal end of the S-shaped lever 20 will contact with the flap 15 and firmly force it on to the top end of the rod 12, and prevent the teeth of the connecting block 10 from severing engagement with the teeth of the tongue 8. On folding the lever 20 down into the handle 17, the cam-shaped enlargement 27 will be withdrawn from contact with the flap 15, when a suitable key introduced in the key-hole 28 can be caused to lift the free end of the spring pawl 26 from contact with the teeth of the pinion 25 and permit disengagement of the teeth of the block pawl 10 from the teeth of the tongue 8 by lifting, by the end of the finger, on the pin 29 which projects from the rod 12 through the wall of the tubular shank 5. The orifice through which said pin 29 projects is vertically slotted to admit of vertical movement enough to separate the teeth of the block pawl 10 from the teeth of the tongue 8, when the latter can be easily withdrawn, thus liberating the wrist inclosed by the cuff 6.

Having thus explained the nature of the invention, and described an operative manner of constructing and using the same although without attempting to set forth all of the forms in which it may be made, or all of the forms of its use, what is claimed is:—

1. In police nippers in combination a tubular stock, a transverse hollow handle connected therewith, an articulated hand-cuff connected to said hollow handle, and adapted to be folded therein; a flap pivoted in said hollow handle, a cam on one of the connected ends of said articulated hand-cuff, and adapted to actuate said flap; a rod connected to a retaining pawl, slidably arranged in the tube of said tubular stock; a pin connected to said rod, said pin projecting through a slot in the wall of said tubular stock, a spiral spring surrounding the lower end of said rod, teeth on the under face of said retaining pawl, a bifurcated semi-circular part connected to the lower end of said tubular stock, a sickle-shaped tongue, the lower end of which is pivoted to and in the opening of said bifurcated part, teeth on the upper side of said tongue, said teeth engaging with the teeth of said retaining pawl, said tongue adapted to swing in a complete circle through said bifurcated part, substantially as described.

2. In police nippers, in combination, a tubular stock, a transverse hollow handle connected to the upper end of said tubular stock, an articulated hand-cuff connected to said hollow handle and adapted to be folded therein; a bifurcated semi-circular part connected to the lower end of said tubular stock; a sickle-shaped tongue pivoted to said bifurcated part and adapted to swing through the opening of said bifurcated part in a complete circle; a retaining pawl terminating in a rod slidably arranged in said tubular stock, said retaining pawl having teeth on its under face; teeth on the upper side of said tongue, said teeth engaging with the teeth of said retaining pawl; a spiral spring surrounding the lower end of said rod, said spring arranged in a cavity of said tubular stock and adapted to cause the teeth of said retaining pawl and teeth of said tongue to engage and disengage; a cam on one of the connected ends of said articulated hand-cuff; a flap pivoted in said hollow handle, said cam adapted to rest firmly against the back of said flap when said articulated hand-cuff is in use, causing said flap to press firmly against the top of said rod, causing the teeth of said retaining pawl and teeth of said sickle shaped tongue to be locked in a permanent position; a pin connected to said rod, said pin projecting through a-slot in the wall of said tubular stock, said pin adapted to be raised by the finger causing disengagement of the teeth of said retaining pawl, and teeth of said tongue, substantially as described.

3. In police nippers, in combination, a tubular stock; a transverse hollow handle connected therewith; an articulated hand-cuff connected to said hollow handle and adapted to be folded therein; a housing on one of the free ends of said articulated hand-cuff; a pinion and a spring pawl pivotally mounted in said housing, teeth on the back of other free end of said articulated hand-cuff, said teeth adapted to engage with teeth of said pinion, said spring-pawl adapted to allow said pinion to rotate in one direction only, thereby acting as a lock and adapted to disengage only when said spring pawl is raised clear of said pinion by a suitable key; a cam on one of the connected ends of said articulated hand-cuff; a flap pivotally mounted in said hollow handle; a retaining pawl slidably arranged in the tube of said tubular stock; teeth on the under face of said retaining pawl; a bifurcated semi-circular part, connected to the lower end of said tubular stock; a sickle-shaped tongue pivoted at the lower end of said bifurcated part and adapted to swing in a complete circle through said bifurcated part; a spiral spring surrounding the lower end of said rod and arranged in a cavity of said tubular stock; teeth on the upper side of said sickle-shaped tongue, said teeth adapted to engage with the teeth of said retaining pawl; a pin connected to said rod and projecting through a slot in the wall of said tubular stock, said pin adapted so when raised to cause the teeth of said retaining pawl and teeth of said sickle shaped tongue to disengage, substantially as described.

4. In a police nippers, in combination, a tubular stock; a transverse hollow handle connected therewith; and articulated hand-cuff connected to said hollow handle and adapted to be folded therein, substantially as described.

5. An improvement in police nippers comprising a handle, foldable hand cuff members attached to said handle, means for maintaining said members in locking engagement when in extended position, a second hand cuff member connected with said handle and formed of articulated sections, means for locking the sections of the second hand-cuff member, and means for preventing unlocking of the second hand-cuff members while said foldable sections are extended.

6. An improvement in police nippers comprising a hollow handle, foldable hand-cuff members attached to and foldable within said handle, means for maintaining said members in locking engagement when in extended position, a second hand-cuff member connected with said handle and formed of articulated sections, means for locking the sections of the second hand-cuff member, and means for preventing unlocking of the second hand-cuff members while said foldable sections are extended.

7. An improvement in police nippers comprising a handle, foldable hand-cuff members attached to said handle, means for maintaining said members in locking engagement when in extended position, a second hand-cuff member connected with said handle and formed of articulated sections, a pawl for locking the second hand-cuff members, and means for preventing movement of said pawl while the foldable hand-cuff members are extended.

8. An improvement in police nippers comprising a handle, foldable hand-cuff members attached to said handle, means for maintaining said members in locking engagement when in extended position, a second hand-cuff member connected with said handle and formed of articulated sections, a pawl for locking the second hand-cuff members, and means operated by one of the foldable hand-cuff members for preventing movement of the pawl while the said foldable members are extended.

9. An improvement in police nippers comprising a handle, foldable hand cuff members attached to said handle, means for maintaining said members in locking engagement when in extended position, a second hand-cuff member connected with said handle and formed of articulated sections, a pawl for locking the second hand-cuff members, a pivoted member for preventing movement of said pawl, and a cam on one of the foldable members for preventing movement of said pivoted member.

10. An improvement in police nippers comprising a handle, hand-cuff members pivoted to said handle, each member consisting of a plurality of pivoted sections capable of being folded closely to the handle, and means for locking said sections in extended relation.

GEORGE W. PRATT.

Copies of this patent may be obtained for five cents each, by addressing the "Commissioner of Patents, Washington, D. C."